Patented Oct. 7, 1930

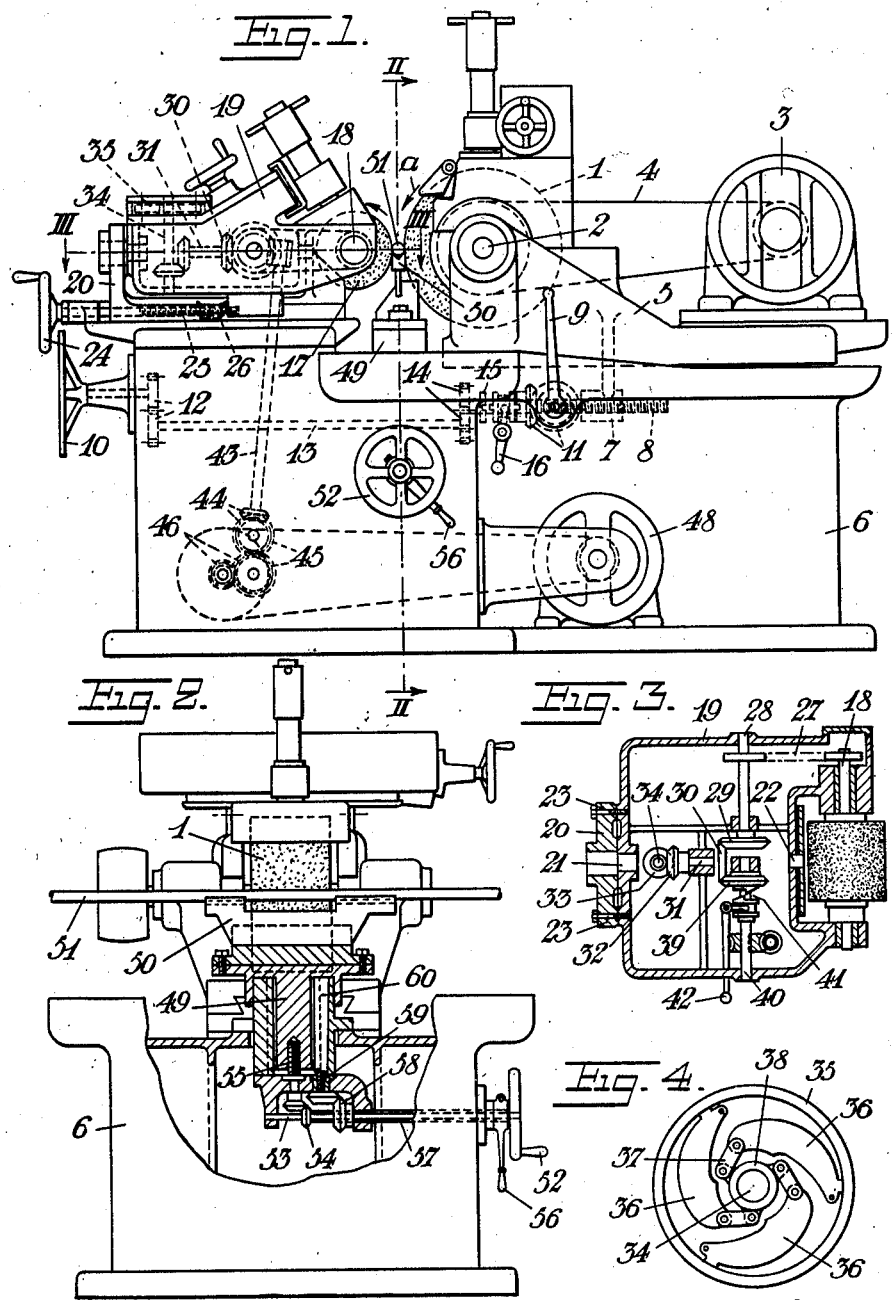
Oct. 7, 1930.   C. G. EKHOLM ET AL   1,777,607
MACHINE FOR GRINDING BODIES OF REVOLUTION
Filed May 6, 1929   2 Sheets-Sheet 1

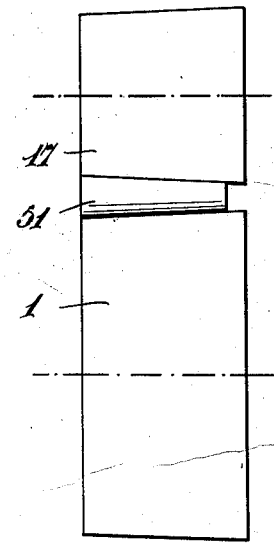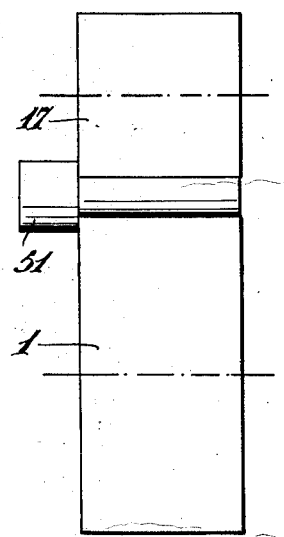

1,777,607

UNITED STATES PATENT OFFICE

CARL GUSTAV EKHOLM AND BENGT DANIEL OSSIAN WESTERLUND, OF LIDKOPING, SWEDEN

MACHINE FOR GRINDING BODIES OF REVOLUTION

Application filed May 6, 1929, Serial No. 360,682, and in Sweden April 9, 1929.

This invention relates to that type of machines for grinding bodies of revolution in which the bodies to be ground are freely supported in the space between two cylindrical, conical or otherwise shaped rotary wheels or the like one of which is a grinding wheel, whereas the other serves as means to regulate the speed of rotation of the body under grinding.

In this type of machine the grinding operation is usually performed according to any of two different methods depending on the shape of the bodies to be ground. One method is employed in the grinding of work pieces of conical shape or work pieces having, generally, different diameters at different sections, or work pieces having a nonrectilinear generatrix. In operation according to this method the work pieces while supported by a suitable carrier and engaging the speed regulating wheel is moved towards the grinding wheel or vice versa, that is to say, the grinding wheel is moved towards the work piece supported in the above described way. A modified form of this method which is especially adapted for use in connection with machines in which the grinding wheel and the speed regulating wheel have parallel axis of rotation and the work piece, while supported by the carrier, is moved tangentially into the space between the grinding wheel and the speed regulating wheel in which case said wheels are so related to each other as to have a predetermined distance between their operative surfaces corresponding to the desired diameter of the work piece. The other grinding method is employed in connection with the grinding of cylindrical work pieces having but one diameter, the grinding operation being performed by causing the work piece, while sliding on the carrier, to pass between the grinding wheel and the speed regulating wheel, said wheels being so related to each other as to have a predetermined distance between their operative surfaces.

In hitherto known machines operating on any of the methods above set forth the regulating wheel is mechanically driven at a surface speed equal to the speed it is desired to impart to the work piece during the grinding operation. The object in so rotating the speed regulating wheel is to give the work piece a continuous uniform rotation as far as possible.

The present invention has for its object to provide a grinding machine in which the mechanical drive for the speed regulating wheel may be dispensed with and in which the speed of revolution of the work piece may be caused automatically to vary in accordance with the depth of cut. Thus, in connection with deep cuts, that is to say in rough grinding, the speed will be comparatively high and the output accordingly large, while at small cuts, that is to say in accurate grinding, the speed will be comparatively low to secure sufficient exactness and an even surface.

The invention is characterized, chiefly, in that the speed regulating wheel is driven exclusively by friction from the work piece and is combined with a braking device to be automatically thrown into operation to control the speed of the regulating wheel as soon as it reaches a predetermined speed of rotation.

In the accompanying drawing a grinding machine embodying this invention is illustrated by way of example. Figure 1 is a side elevation of the machine. Fig. 2 is an end view thereof, with certain parts shown in section on the line II—II in Fig. 1. Fig. 3 is a horizontal section of the speed controlling mechanism on the line III—III in Fig. 1. Fig. 4 is a top plan view of a form of brake to be used in connection with the speed regulating wheel. Figs. 5 and 6 are diagrammatic enlarged detail views showing the shape and position of grinding wheels for work pieces having different diameters at various sections.

In the drawing only such parts of the grinding machine are shown as are necessary for the understanding of the invention.

With reference to the drawing, the numeral 1 indicates the grinding wheel which is secured to the horizontal transverse shaft 2 and is driven from the motor 3, as through the medium of a belt transmission 4 or in any other suitable way. The shaft 2 is journaled in a slide 5 which may be adjusted longitudinally in ways in the machine frame 6. The slide 5 also supports the motor 3. The adjustment of the slide may be effected by a screw 8 rotatably mounted in the frame 6 and engaging a threaded hole in a bracket 7 depending from the slide. For the rotation of the screw 8 there is provided both a handle 9 and a hand wheel 10. The handle 9 which is adapted for quick movement of the slide is geared to the screw 8 through the medium of a bevel gear 11, while the hand wheel 10 which is adapted for accurate adjustment of the slide is geared to the screw 8 by means of toothed gears 12, intermediate shaft 13, toothed gear 14, and disengaging clutch 15. The latter may be controlled by the handle 16.

17 indicates the speed regulating wheel which is secured to a shaft 18 which in the embodiment shown is parallel to the shaft 2 of the grinding wheel but which may also have a different position relatively to the shaft of the grinding wheel. The shaft 18 is journaled in a carrier 19 which is in turn pivotally mounted in a slide 20 by means of journals 21, 22 extending at right angles to shaft 18. The slide 20 is adjustable longitudinally in ways in the frame 6 so that it may be reciprocated in the same direction as slide 5. Setting of the carrier 19 in any angular position desired relatively to slide 20 may be effected by any appropriate means, as by screw bolts 23, Fig. 3, extending through holes in the slide 20 and which may be screwed into any of a number of holes formed in the carrier 19. The longitudinal displacement of the slide 20 may be effected by means of a screw 25 rotatably mounted in the frame 6 and engaging a threaded hole in a bracket 26 depending from the slide 20. The screw 25 may be operated by the hand wheel 24.

The shaft 18 of the speed controlling wheel is connected, as by a belt transmission 27 or the like, to a shaft 28 journaled in the carrier 19, said shaft 28 being parallel to shaft 18. The shaft 28 is connected by means of the bevel gears 29, 30, the intermediate shaft 31 and the bevel gears 32, 33 to the vertical shaft 34 of a braking device indicated at 35 in Fig. 1 and more clearly shown in top plan view in Fig. 4. Said braking device is shown as a centrifugal brake comprising a stationary, cylindrical casing 35 and a number of weights 36 to engage the inner surface of said casing, said weights being connected by links 37 to a hub 38 secured to the shaft 34 so that they will be thrown against the casing 35 upon the rotation of shaft 34.

The bevel gear wheel 30 above referred to meshes also in a bevel gear wheel 39 freely mounted upon a shaft 40 journaled in the carrier 19 in alinement with the shaft 28. The bevel gear wheel 39 may be coupled to the shaft 40 by means of the disengaging clutch 41 under the control of the lever 42. The shaft 40 is connected over the intermediate shaft 43, a set of gear wheels 44, 45, 46, and a belt transmission 47 or the like to a power motor 48 for a purpose to be hereinafter set forth.

Secured to the machine frame in the space between the two slides 5 and 20 is a pedestal 49 carrying a bar 50 to support the work piece 51. This supporting bar which extends parallel to shaft 2 and is formed with a V-shaped top surface may, however, have another direction than that shown, and its top surface may be plane or of any other shape in conformity with the shape of the work piece. The pedestal 49 may be raised and lowered by means of the hand wheel 52, inasmuch as the shaft 53 of said hand wheel may rotate by means of the bevel gear 54 a vertical screw 55 mounted in the frame 6 and engaging a threaded boring in the under side of the pedestal 49. Locking of the pedestal in the position desired may be effected by means of the handle 56 which is connected over the hollow shaft 57 surrounding the shaft 53, the bevel gear 58, and the screw 59 to a wedge 60 which is movable up and down in a downwardly tapering space between the pedestal and its guide. By moving the handle 56 the wedge 60 may be depressed to lock the pedestal in position.

The operation of the machine is as follows:

The grinding wheel 1 is caused to rotate in the direction of the arrow $a$ in Fig. 1, that is, downwardly at its side facing the work piece. In grinding cylindrical work pieces as shown in the drawing, which is of equal diameter at all sections, the wheels 1 and 17 are placed at a certain distance apart, the work piece being moved longitudinally between the wheels. The carrier 19 of the speed regulating wheel may be set to an angular position in which the shaft 18 is inclined sufficiently to secure an automatic feed of the work piece by the wheel 17 when in rotation. The rotation of the wheel 17 is effected by the friction between the wheel and the work piece. If the speed regulating wheel were not combined with a brake the grinding wheel, the work piece, and the speed regulating wheel would all rotate at, substantially, the same peripheral speed like three toothed wheels in gear with each other and, consequently, there would be no grinding effect at all. The brake, however, will act to considerably reduce the speed of the regulating wheel thereby to give the work piece a speed of rotation suitable to insure a high grinding effect.

As shown in Figs. 5 and 6 grinding work pieces having different diameters at various sections, as conical rolls and the like, the work piece 51 is placed upon the supporting bar in the space between the wheels 1 and 17 while the grinding wheel 1 is retracted, whereupon the grinding wheel is again moved towards the work piece by means of the handle 9. In this case the work pieces are not passed in succession between the wheels but are placed in position individually, that is one at a time. This will cause the speed regulating wheel 17 to stop or in any case considerably reduce its speed in the interval between the removal of one work piece and the insertion of another work piece. In order to avoid this the power transmission from the motor 48 to the shaft 18 of the speed regulating wheel should be thrown into action prior to the insertion of a work piece by throwing the clutch 41 into gear. This movement of the speed regulating wheel should be of a comparatively low speed and must not control the speed of rotation of the work piece after the grinding wheel has come into engagement therewith, because of the fact that the speed regulating wheel should then be free automatically to regulate the speed in agreement with the depth of cut. To this end the clutching device is constructed so as to be disengaged as soon as the driving of the speed regulating wheel is accomplished by the work piece.

What we claim is:

1. A machine for grinding bodies of revolution comprising a rotary grinding wheel, a regulating wheel adapted to be driven from contact with the bodies while being ground, means to support the bodies between said wheels, and means in combination with said regulating wheel to brake the speed of rotation thereof.

2. A machine for grinding bodies of revolution comprising a rotary grinding wheel, a regulating wheel adapted to be driven from contact with the bodies while being ground, means to support the bodies between said wheels, and a braking mechanism driven from said regulating wheel adapted automatically to be put in operation to reduce the speed of rotation thereof after the regulating wheel has attained a certain speed.

3. A machine for grinding bodies of revolution comprising a stationary frame, a pair of slides mounted in said frame to move towards and from each other, a rotary grinding wheel on one of said slides, a carrier mounted in the other slide to swing about an axis extending in the direction of movement of said slide, a regulating wheel rotatably mounted in said slide adapted to be driven from contact with the bodies while being ground, means to support said bodies between said wheels, a braking mechanism mounted in said carrier, and means to operate said braking mechanism from said regulating wheel.

4. A machine for grinding bodies of revolution comprising a rotary grinding wheel, a regulating wheel adapted to be driven from contact with the bodies while being ground, means to support the bodies between said wheels, means in combination with said regulating wheel to brake the speed of rotation thereof, and power driven means to rotate the regulating wheel while out of contact with said bodies.

5. A machine for grinding bodies of revolution comprising a rotary grinding wheel, a regulating wheel adapted to be driven from contact with the bodies while being ground, means to support the bodies between said wheels, a braking device to be driven from said regulating wheel, a power drive to rotate the regulating wheel while out of contact with said bodies, and clutching means to connect said power drive to the regulating wheel and disconnect it therefrom.

6. A machine for grinding bodies of revolution comprising a rotary grinding wheel, a regulating wheel adapted to be driven from contact with the bodies while being ground, means to support the bodies between said wheels, and a centrifugal brake to be driven from said regulating wheel adapted to be put into operation when the regulating wheel reaches a certain speed of rotation to reduce said speed.

In testimony whereof we have signed our names.

CARL GUSTAV EKHOLM.
BENGT DANIEL OSSIAN WESTERLUND.